US005404493A

United States Patent [19]
Bolme et al.

[11] Patent Number: 5,404,493
[45] Date of Patent: Apr. 4, 1995

[54] METHOD AND COMPUTER SYSTEM FOR PROCESSING KEYCODE DATA AND SYMBOL CODE DATA IN A BAR CODE DEVICE

[75] Inventors: Paul A. Bolme, Everett; Jeff Hunt, Kirkland; Charles McCall; Ken Ogami, both of Bothell; Jon Ramberg, Lynnwood, all of Wash.

[73] Assignee: Intermec Corporation, Everett, Wash.

[21] Appl. No.: 978,938

[22] Filed: Nov. 17, 1992

[51] Int. Cl.6 .............................................. G06F 3/023
[52] U.S. Cl. .............................. 395/500; 364/DIG. 1; 364/DIG. 2; 364/234; 364/237.8; 364/237.85; 364/928; 364/932; 364/932.61; 364/932.62
[58] Field of Search ................. 364/DIG. 1 MS File, 364/DIG. 2 MS File; 395/500, 800; 235/462, 470, 471, 472; 340/706, 707, 708, 709, 710, 711; 341/13, 26; 345/156, 169, 166

[56] References Cited

U.S. PATENT DOCUMENTS 4,825,058  4/1989  Poland ............................ 235/472
5,034,598  7/1991  Poland ............................ 235/435
5,261,079  11/1993 Celi, Jr. .......................... 395/500

Primary Examiner—Robert B. Harrell
Attorney, Agent, or Firm—Seed & Berry

[57] ABSTRACT

A method and system for the data entry of bar code data into computer programs that are designed to accept bar code data (reader application programs) and for the data entry of bar code data into computer programs that are not designed to accept bar code data (non-reader application programs) is provided. The bar code data is entered as a contiguous stream of characters, rather than one character at a time, so that lengthy bar code data strings will not be corrupted. Additionally, the method and system of the present invention provide for two-way communication between bar code-reading and processing services and a reader application program so that the reader application program may, among other things, reconfigure the bar code-reading reading and processing services.

16 Claims, 9 Drawing Sheets

METHOD AND COMPUTER SYSTEM FOR PROCESSING KEYCODE DATA AND SYMBOL CODE DATA IN A BAR CODE DEVICE

TECHNICAL FIELD

This invention relates generally to a method and computer system for data entry of bar code symbols, and more particularly, to a method and computer system for interfacing bar code input with either a non-bar code reading application program or a bar code-reading application program.

BACKGROUND OF THE INVENTION

A symbology-reading input device typically uses a sensing beam to read a symbology, such as a bar code, which consists of alternating areas ("bars") having differing characteristics to which the beam is sensitive. The bar code, or other symbology, can be used to store information or commands which are addressed to other devices. After sensing the symbology, the input device then receives and interprets the fluctuations in the returning sensing beam that are caused by the symbology. For example, it is known in the prior art to read symbology by means of a hand-held wand which makes contact with the surface on which the symbology is printed and reads the symbology by means of a beam of light. It is also known to use a non-contact scanning device to cause a beam of light to scan across an area containing a bar code.

Such input devices typically transform the reflected scanning beam to an electronic data form for decoding. In one prior art system, the electronic data form is then input to the system wherein a symbology-reading input device driver decodes the electronic data form into a form recognizable by a bar code-reading application program operating on the system.

In another prior art system, the electronic data form is decoded into ASCII characters and transferred across an RS232-type asynchronous serial interface to a serial communication port buffer of the system, and then passed to a bar code-reading application program operating on the system.

Although some computer programs are written to accept bar code data, most computer programs are designed to receive data typed by a user at a computer keyboard. These programs are called non-reader application programs because they are not designed to read bar code data. The problem with most computer programs being designed to receive data typed by a user at a computer keyboard is that many people are not proficient at typing. They shun using computers because it is burdensome to enter data. These people, however, would use a computer if the computer program would accept bar code data entry. Also, there are many situations where the use of a keyboard is impractical and error-prone, and where the use of bar code data entry would be practical and virtually error-free.

Some bar code-reading input devices can be attached to special hardware that causes the bar code input to emulate keyboard input. When connected to a computer system, such bar code-reading input devices and speciality hardware enable a user to scan symbols that represent standard characters or commonly used words to input the characters or words into the computer system. Only reader application programs, i.e., programs specially customized to accept bar code data, can accept bar code data without requiring the bar code signals to be transferred to keyboard input.

Another problem with connecting such bar code-reading input devices and speciality hardware to a computer system is that the devices only permit one-way communication with a reader application program running on the computer system. The bar code-reading input device sends information to the reader applications; the reader application program cannot send information back to the bar code-reading input device. It follows that the reader application program cannot reconfigure the way in which the bar code input is decoded or reconfigure the bar code reader to read a different type of bar code.

SUMMARY OF THE INVENTION

The method and system of the present invention provide for the data entry of bar code data into computer programs that are designed to accept bar code data (reader application programs) and for the data entry of bar code data into computer programs that are not designed to accept bar code data (non-reader application programs). The bar code data is entered as a contiguous stream of characters, rather than one character at a time, so that lengthy bar code data strings will not be corrupted. Additionally, the method and system of the present invention provide for two-way communication between bar code-reading and processing services and a reader application program so that the reader application program may, among other things, reconfigure the bar code-reading reading and processing services.

The present invention replaces the prior art combination of a bar code-reading input device and specialty hardware by embedding hardware and software within a PC. As a result, an application program operating on the PC can reconfigure the embedded hardware and software. Both reader and non-reader application programs can operate on the PC and accept bar code data.

DETAILED DESCRIPTION OF THE INVENTION

Figure 1:
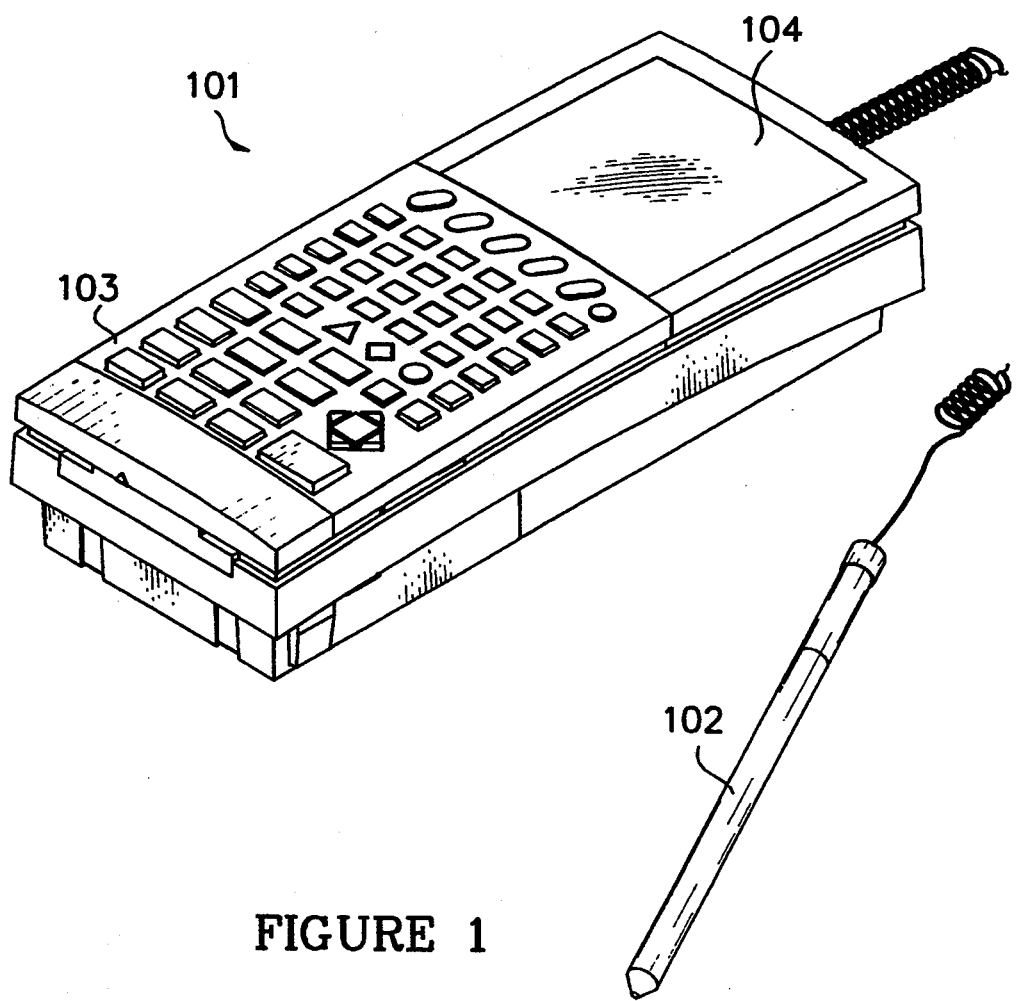
FIG. 1 is an illustration of a computer system configured to implement the method of the present invention.

FIG. 1 illustrates a computer system 101 configured to implement the method of the present invention. The computer system 101 includes a hand-held bar code-reading input device 102 and a keyboard 103, and a display screen 104 built into a hand-held case. The computer system 101 is compatible with the PC/AT, in that it supports the entire 80386 processor instruction set and has essentially the same interrupt hardware. It also has an I/O structure that uses system calls compatible with the PC/AT's basic input-output system (BIOS). For a complete discussion of the PC/AT, see Baron & Higbie, Computer Architecture (1992).

The methods of the present invention provide the computer system 101 with the ability to be used as a hand-held bar code reader that will run non-reader application programs as well as reader application programs. The computer system 101 is both a bar code reader and a personal computer (PC). It enables users that are familiar with PC methodology to take advantage of bar code methodology as a more efficient means of interfacing with an application program.

The computer system 101 provides software bar code reader services to decode and process bar code input. This is a key feature which distinguishes the present invention from prior art systems. As with most PC's, the present invention uses software interrupts as the fundamental method for accessing operating system and BIOS services.

Figure 2:
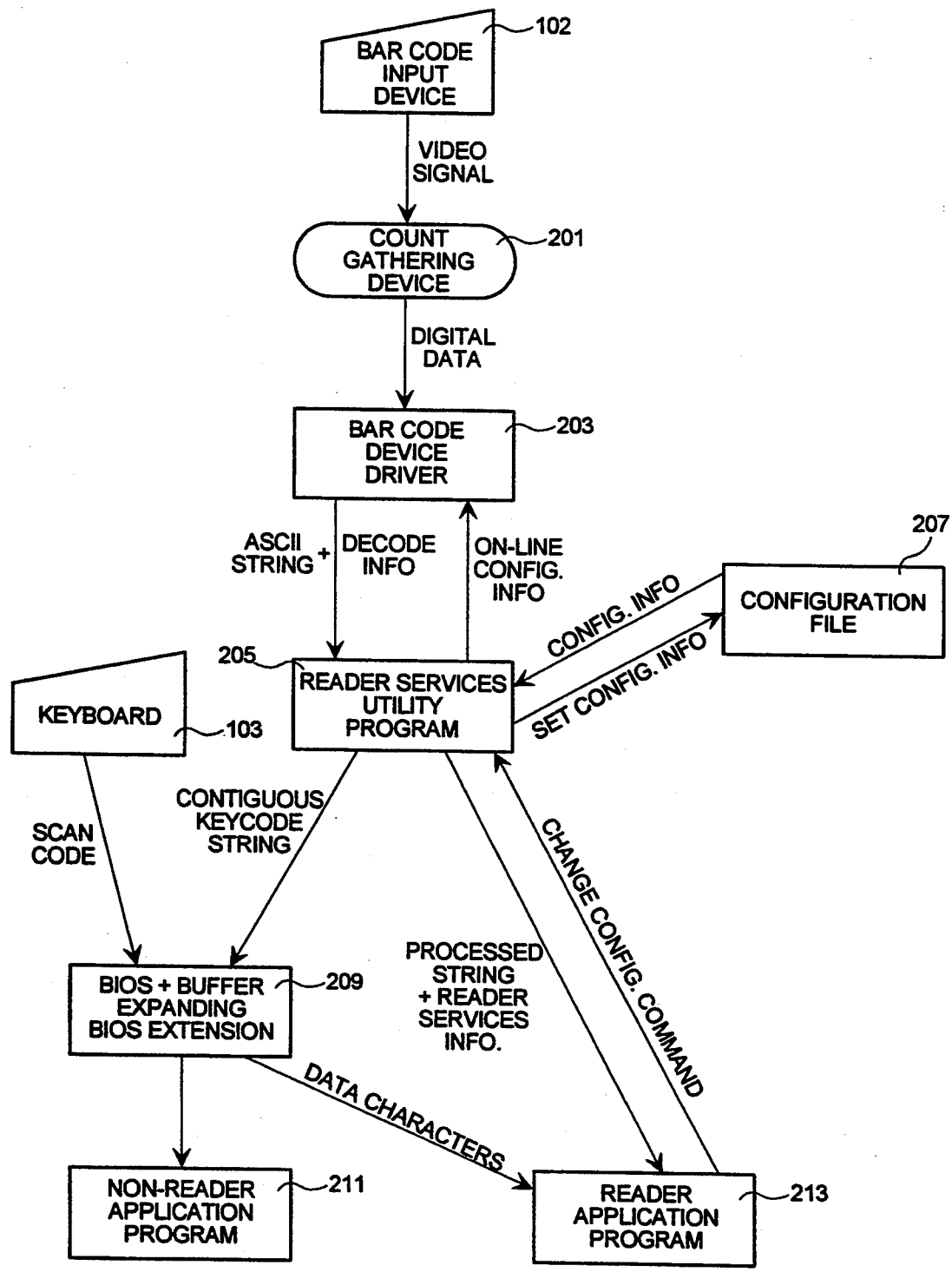
FIG. 2 is a schematic diagram of data flow between the bar code input device and keyboard of FIG. 1 and a reader and a non-reader application program operating on the computer system of FIG. 1.

A schematic diagram of data flow between the bar code input device 102 and keyboard 103 of FIG. 1 and a reader and a non-reader application program is illustrated in FIG. 2.

Referring to FIG. 2, a non-decoding bar code input device 102 "scans" a bar code symbol and produces an analog electrical video signal which contains information relating to the scanned symbol. The video signal is received by a count gathering hardware device 201, which converts the video signal to digital bar code data (digital data).

The digital data is then input to a bar code device driver 203, which decodes the digital data to produce a decoded bar code label. The decoded bar code label comprises an ASCII character string plus decode information. The bar code device driver receives on-line configuration information from a reader services utility program 205 which in turn receives configuration information from a reader application program 213 in the form of reader commands, and from a configuration file 207 about how to decode the data.

The reader services utility program 205 receives the decoded bar code label and, depending on which mode the program is in, i.e., direct access or indirect access, the program processes the label to produce either 1) a processed ASCII character string plus reader command information, or 2) a contiguous processed ASCII character or keycode string. A keycode is a 16-bit value made up of 8 bits of PC keyboard scan code and 8 bits of ASCII character code.

The reader services utility program 205 also parses the decoded bar code label for the presence of special combinations of characters, which indicate that the decoded bar code label contains reader commands. If the decoded bar code label contains reader commands, then the reader services utility program 205 carries out the commands. The reader services utility program can also process reader commands from the reader application program 213. The reader services utility program is described in more detail below with reference to FIGS. 4A-4B and FIG. 5.

A scan code is an 8-bit value or a sequence of 8-bit values that is transmitted to the operating system whenever a key of the keyboard 103 is pressed or released. Each key on the keyboard has a unique scan code. This code is not the same as the ASCII character code for the letter, number, or symbol shown on the key; it is a special identifier for the key itself and is always the same for a particular key. When a key is pressed and/or released, the scan code is transmitted to the operating system and translated into a single scan code value by the native Int 9 interrupt service where a portion of the BIOS dedicated to the keyboard translates the scan code into its ASCII equivalent.

When the indirect access mode is activated, the processed ASCII character or keycode string is passed to buffer expanding BIOS extension 209. If the buffer expanding BIOS extension 209 receives a processed ASCII character string, then a scan code is appended to produce an equivalent keycode string. The buffer expanding BIOS extension 209 then inserts the keycode string into a buffer accessible by application programs operating on the computer system 101. The buffer expanding BIOS extension 209 inserts the information in such a way as to preserve the integrity of contiguous information contained in the keycode string.

The buffer expanding BIOS extension 209 allows insertion of keycode string inputs which exceed the normal length restrictions of the standard BIOS buffer by providing an expanded buffer. As mentioned briefly above, when passing a processed ASCII character code string, the buffer expanding BIOS extension provides a scan code for each ASCII character as expected by the standard BIOS buffer. The expanded key buffer entails the addition of unique services to those provided by the standard BIOS buffer and the existing low level keyboard services and some modification to the existing low level keyboard services in order to accomplish label passing features. The buffer expanding BIOS extension is explained in more detail below with reference to FIGS. 6A-6B and FIG. 7.

Once the keycode string is in the standard BIOS buffer, a non-reader application program 211 or the reader application program 213 can access the string through standard operating system services.

The reader application program 213 has the additional option of directly accessing the processed ASCII character string plus reader command information. To do so, the reader application program can deactivate the indirect access mode in favor of a direct access mode as explained below in more detail.

The direct access mode has the benefit of providing reader command information which includes the symbology type of the scanned label and whether reader commands were detected with the processed keycode string.

Figure 3:
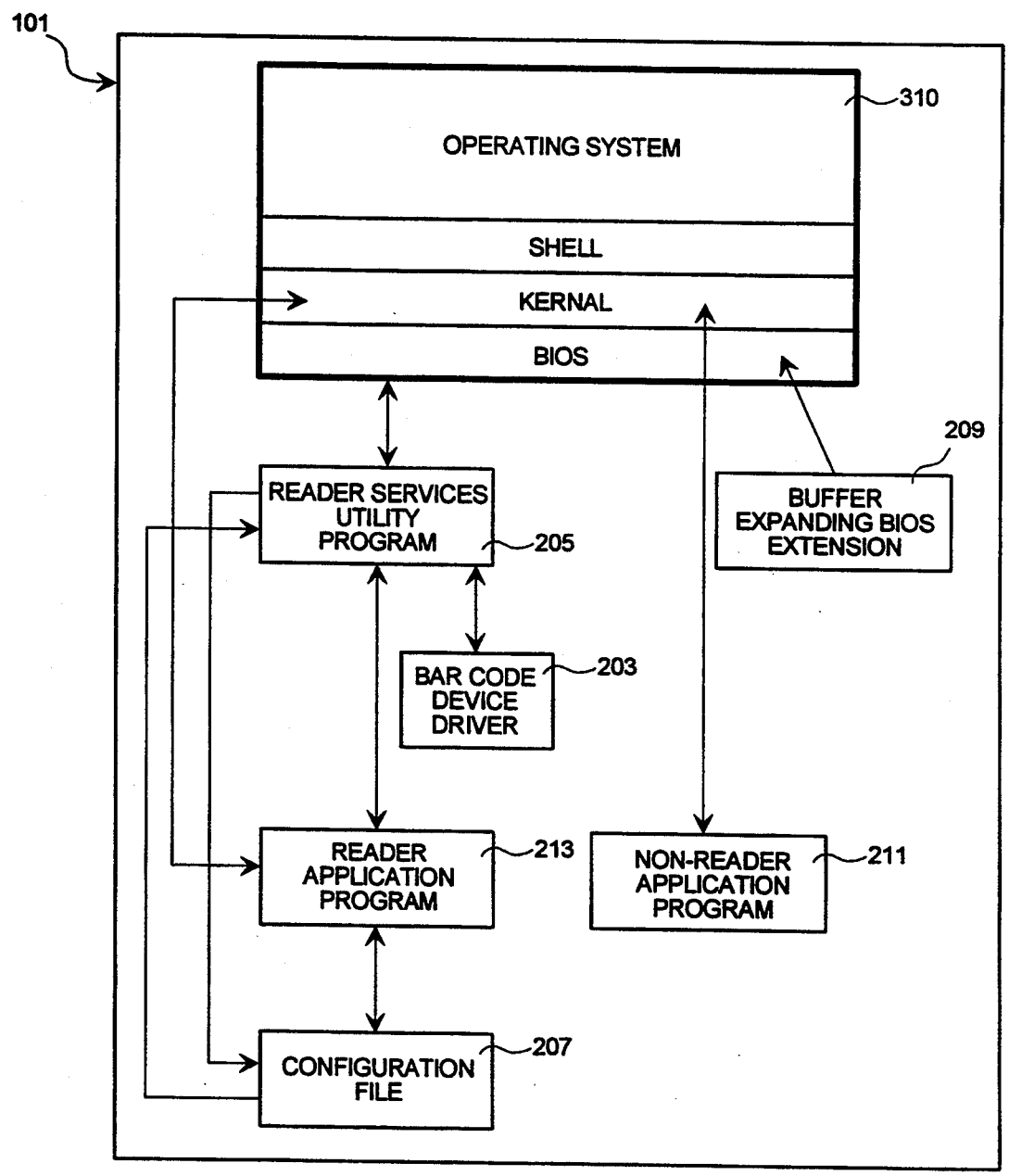
FIG. 3 is an overview block diagram of the software architecture of the computer system of FIG. 1, including a reader services utility program, a buffer expanding BIOS extension, a bar code device driver, a reader application program, a non-reader application program, and a configuration file, in addition to standard operating system software.

FIG. 3 is an overview block diagram of the software architecture of the computer system 101, including the reader services utility program 205, the buffer expanding BIOS extension 209, the bar code device driver 203, the reader application program 213, the non-reader application program 211, and the configuration file 207, in addition to standard operating system software 310. In a preferred embodiment, the standard operating system is MS-DOS, but the present invention could be configured to run under any suitable operating system. Each of the software components illustrated in FIG. 3 is explained in more detail below.

Operating System BIOS. Aside from system initialization, the primary purpose of BIOS is to provide a common software interface to the computer system hardware. BIOS is specific to the individual computer system and is provided by the manufacturer of the system. It contains the default resident hardware-dependent drivers for such hardware as I/O devices, interrupt controller, timer, DMA controller, and keyboard. MS-DOS communicates with these device drivers through I/O request packets; the device drivers then translate these requests into the proper commands for the various hardware controllers.

Operating System Kernel. The kernel implements the operating system as it is seen by application programs by providing a collection of hardware-independent services called system functions. Examples of system functions include memory management and character-device input/output. Programs can access system functions by loading registers with function-specific parameters and then transferring to the operating system by means of a software interrupt.

Operating System Shell. The shell, or command processor, is a user's interface to the operating system. It is responsible for parsing and carrying out user commands, including the loading and execution of other programs from a disk or other mass-storage device. The default shell that is provided with the MS-DOS operating system is found in a file called COMMAND.COM.

Configuration File. The configuration file 207 is an optional file containing commands that enable the user to customize the operating system environment and the reader services environment. For instance, the user can specify that the reader services utility program 205 translate user selected ASCII characters to user selected keyboard keycodes which are not directly represented in the set of ASCII characters (these characters can be encoded in a bar code label to produce a keycode string instead of a processed ASCII string). The user can also specify that the reader services utility program 205 append/prepend a user programmable string to the ASCII string. Additionally, the user can specify the way in which the bar code is decoded or specify how the bar code reader should be configured; that is, specify what type of bar code should be read.

Reader Services Utility Program. In the software architecture of the computer system 101, the reader services utility program 205 controls, among other things, the bar code reader services, providing these services in two distinct modes:

1) direct access mode: The reader application program 213 is operating on the computer system 101. In this mode, an input manager provides program access to all reader input and output services. This mode is powerful, taking advantage of all features of the computer system. This mode is complex in that it requires modifications to be made to standard application programs.

2) indirect access mode: The non-reader application program 211 is operating on the computer system 101. In this mode, bar code input is transformed and inserted into a keyboard buffer of the computer system 101 so that the non-reader application program 211 or the reader application program 213 can access the input. This is the default mode until the reader program operating on the computer system 101 changes the mode. Using the indirect access mode, the computer system 101 can receive bar code input at the MS-DOS prompt with COMMAND.COM running. This mode is advantageous for simple programs and standard application programs. It allows program developers rapid porting of their standard PC programs to bar code reader services of the computer system.

The reader services utility program 205 performs the additional functions of parsing the inputs to locate reader commands (instructions on how to process the bar code input) and then processing the reader commands as required. For instance, a reader command could be a command to alter the configuration of the operating system or the reader services environment. For bar code label inputs, pre-amble and post-amble processing, translation, and scan translation functions are also incorporated.

The reader services utility program 205 is partitioned into four sub-processes: the Input Manager, the Bar Code Manager, the Configuration Manager, and the Reader Command Manager. The Input Manager provides the primary interface to the reader application and handles management of the various input sources. The Bar Code Manager is the entry into the reader services utility program for bar code label inputs. The ASCII to keycode translation is handled here. The Reader Command Manager contains the parser for reader commands and the interface for the services required to actuate the controls specified by reader commands. The Configuration Manager directs requests to change configuration. These subprocesses are described in detail in Appendix A.

The reader services utility program 205 is loaded from an MS-DOS file and becomes resident after performing initialization. Only one application program is attached to the reader services utility program at a time for direct application data transfer.

Figure 4A:
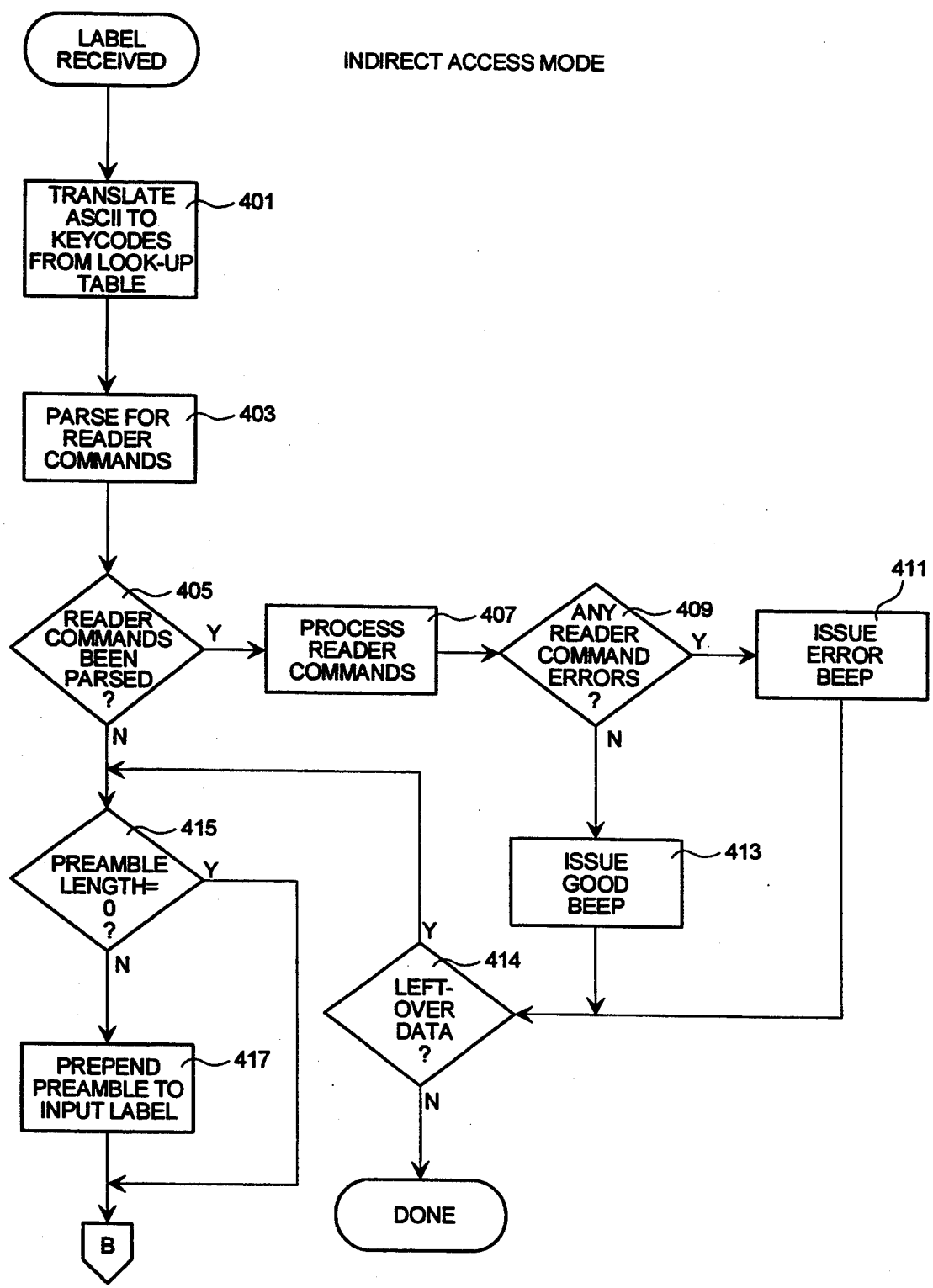
FIGS. 4A–4B comprise a flow diagram of the reader services utility program in an indirect mode.
Figure 5:
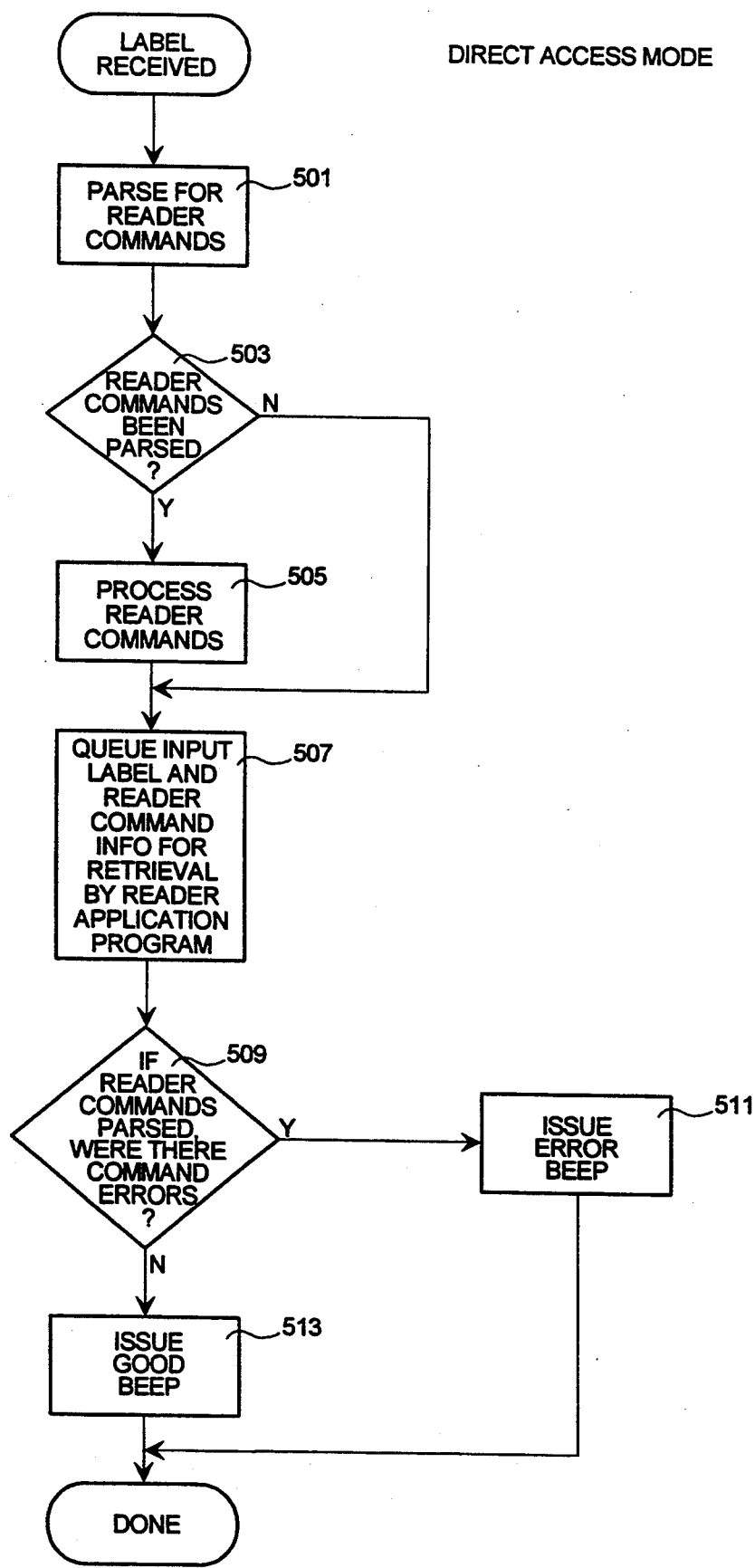
FIG. 5 is a flow diagram of the reader services utility program in a direct access mode.

FIG. 4A illustrates a flow diagram of the reader services utility program in the indirect access mode. After an input label has been received from the bar code device driver 203, in step 401, the reader services utility program (RSUP) translates the ASCII characters to keycodes from a lookup table. If a keycode is not available, the RSUP leaves the characters in ASCII form. In step 403, the RSUP parses the processed ASCII character or keycode string for reader commands. If the RSUP determines in step 405 that reader commands are present, then in step 407 the RSUP processes the reader commands. In step 409, the RSUP determines whether any reader command errors have occurred and cause an appropriate sounding beep to be issued.

Figure 4B:
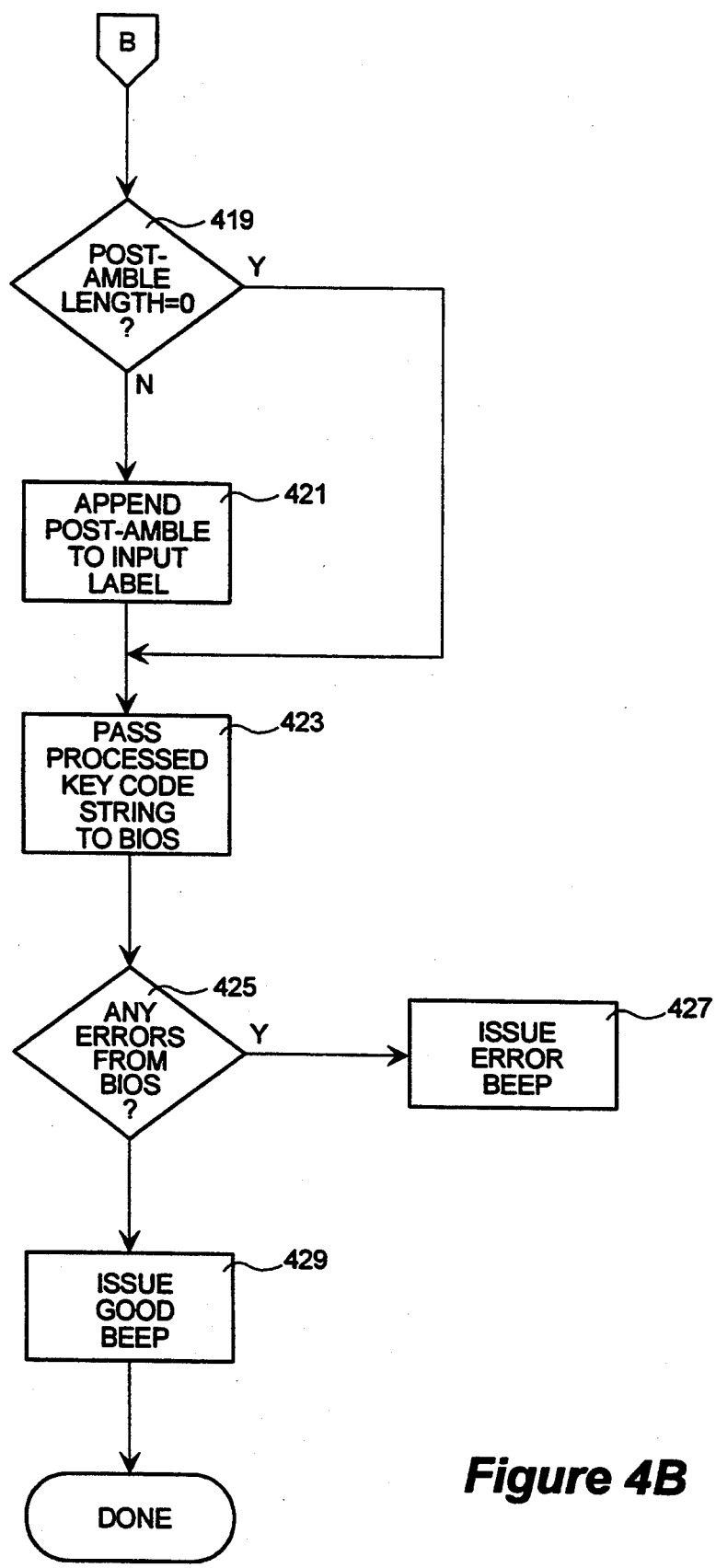

In step 414, the RSUP determines whether the input label contains information other than reader commands. If so, then in step 415 the RSUP determines whether a preamble should be attached to the beginning of the input label. A preamble is specified in the configuration file 207. If a preamble should be attached to the beginning of the input label, the RSUP does so in step 417. Referring now to FIG. 4B, in step 419 the RSUP determines whether a postamble should be attached to the end of the input label. An example of a postamble is a carriage return. If a postamble should be attached to the end of the input label, then in step 421 the RSUP does so.

In step 423, the RSUP passes the processed ASCII character or keycode string to BIOS, where the buffering expansion BIOS extension makes the input label available for either a reader or a non-reader application program. If any error codes are returned from BIOS, then an appropriate sounding beep is issued in either step 427 or step 429.

Buffer expanding BIOS extension. A BIOS extension will provide, among other things, keyboard buffer expansion services and label passing enhancements. In a preferred embodiment, the buffer expanding BIOS extension interfaces directly to the standard operating system BIOS buffer to expand the keyboard buffering capacity from the standard 16 keycodes to 270 keycodes. The expanded buffer has been designed to be an optional feature that can be activated and deactivated through a simple BIOS call.

If the buffer expanding BIOS extension is not active, then the reader services utility program will not be able to pass complete labels to the BIOS keyboard buffer; instead, such labels must be passed one character at a time as allowed by the standard BIOS Int 16h, function 5 service.

Key buffer expansion is provided to allow the insertion of whole labels into the keyboard stream. Otherwise, label-passing application programs would have to pass one character at a time using the standard Int 16h, function 5, with IRQ1 masked for the duration of the input. IRQ1 is masked to prevent unplanned input from the keyboard while the label is being input. IRQ1 does not necessarily prevent other asynchronous processes from interleaving characters with the bar code input as does the present invention. The buffer expanding BIOS extension includes software-interrupt intercepts for both Int 16h and Int 9.

To achieve compatibility with MS-DOS device drivers that implement international language support, in a preferred embodiment the expanded buffer is an extension of the standard buffer rather than a replacement. This approach allows the device driver's Int 9 intercept to translate keycodes within the boundaries of the standard buffer without modifications to the device driver. Once the keycode has been processed by the device driver's intercept, the expanded buffer intercept will shuttle the translated keycode to the expanded buffer as needed.

Figure 7:
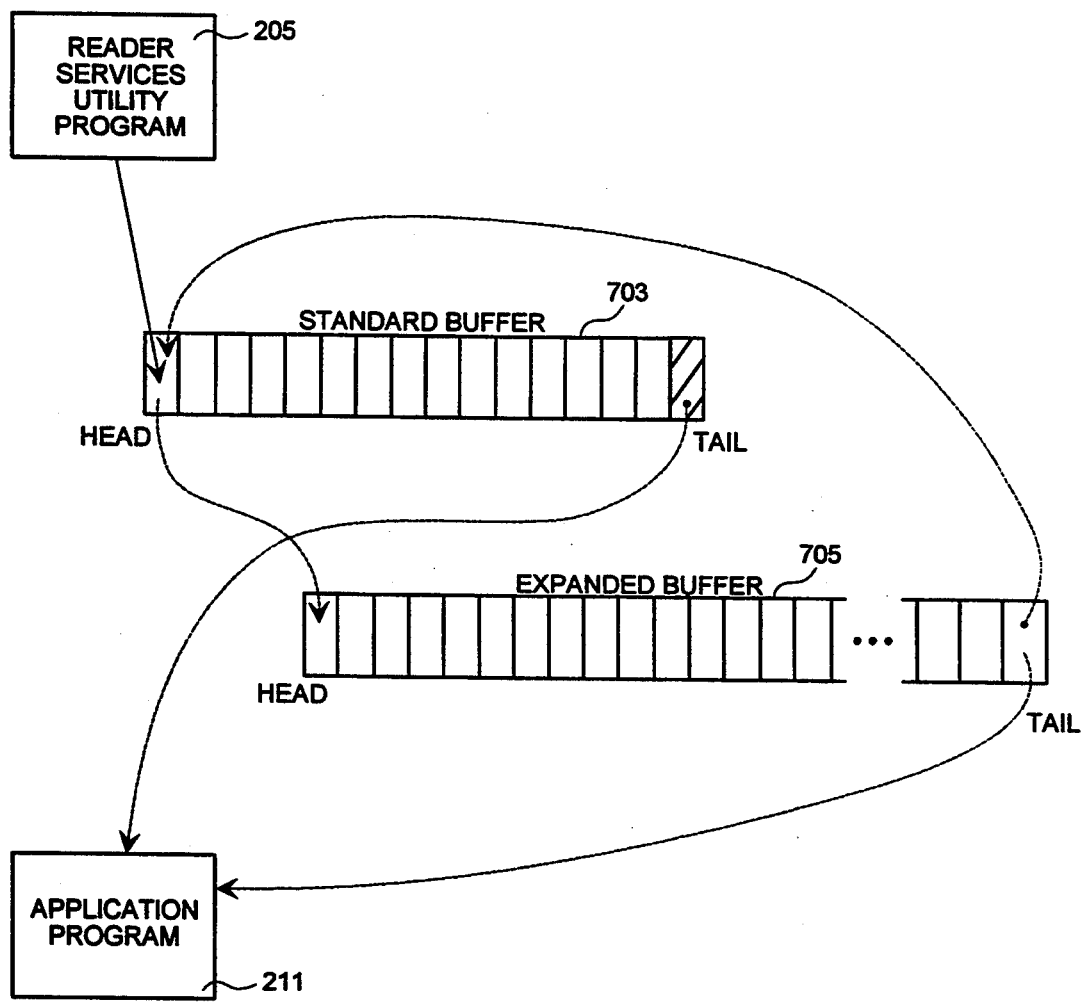
FIG. 7 is a schematic diagram of data flow between a standard buffer and an expanded buffer as described in the flow diagram of FIG. 6.

Referring to FIG. 7, the buffer expanding BIOS extension transfers keycodes back and forth between a standard buffer 703 and an expanded buffer 705. These buffers are actually circular buffers in linear memory. Standard BIOS services use a head pointer and a tail pointer to keep track of the beginning and end of the keycodes being buffered in the standard buffer. Similarly, the buffer expanding BIOS extension also uses a head pointer and a tail pointer to keep track of the beginning and end of the keycodes being buffered in the expanded buffer. The present invention is compatible with the standard BIOS services.

When the standard buffer 703 is full, the buffer expanding BIOS extension moves keycodes to the expanded buffer 705.

Figure 6A:
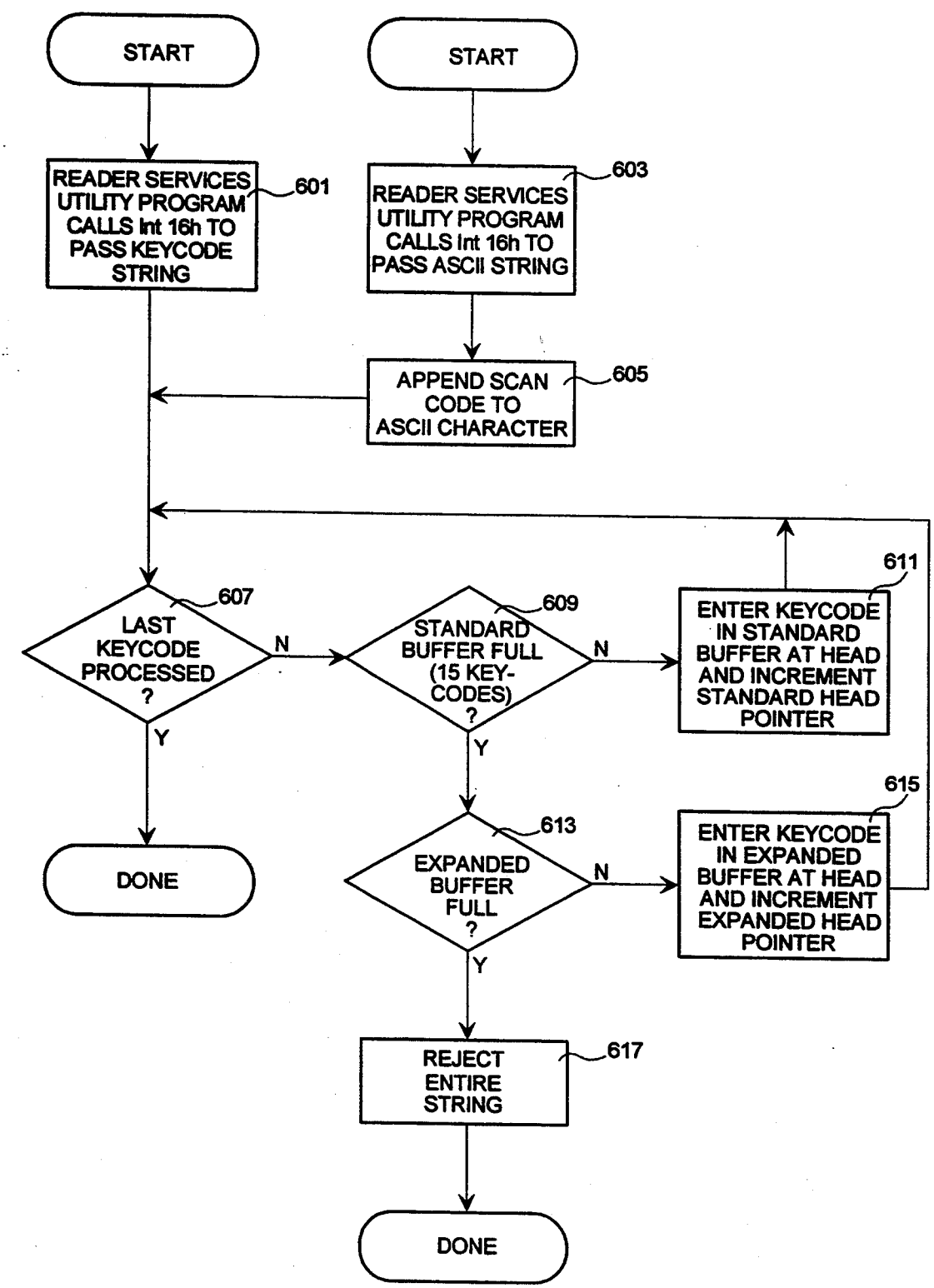
FIG. 6A is a flow diagram of the buffer expanding BIOS extension as it interacts with the reader services utility program.
Figure 6B:
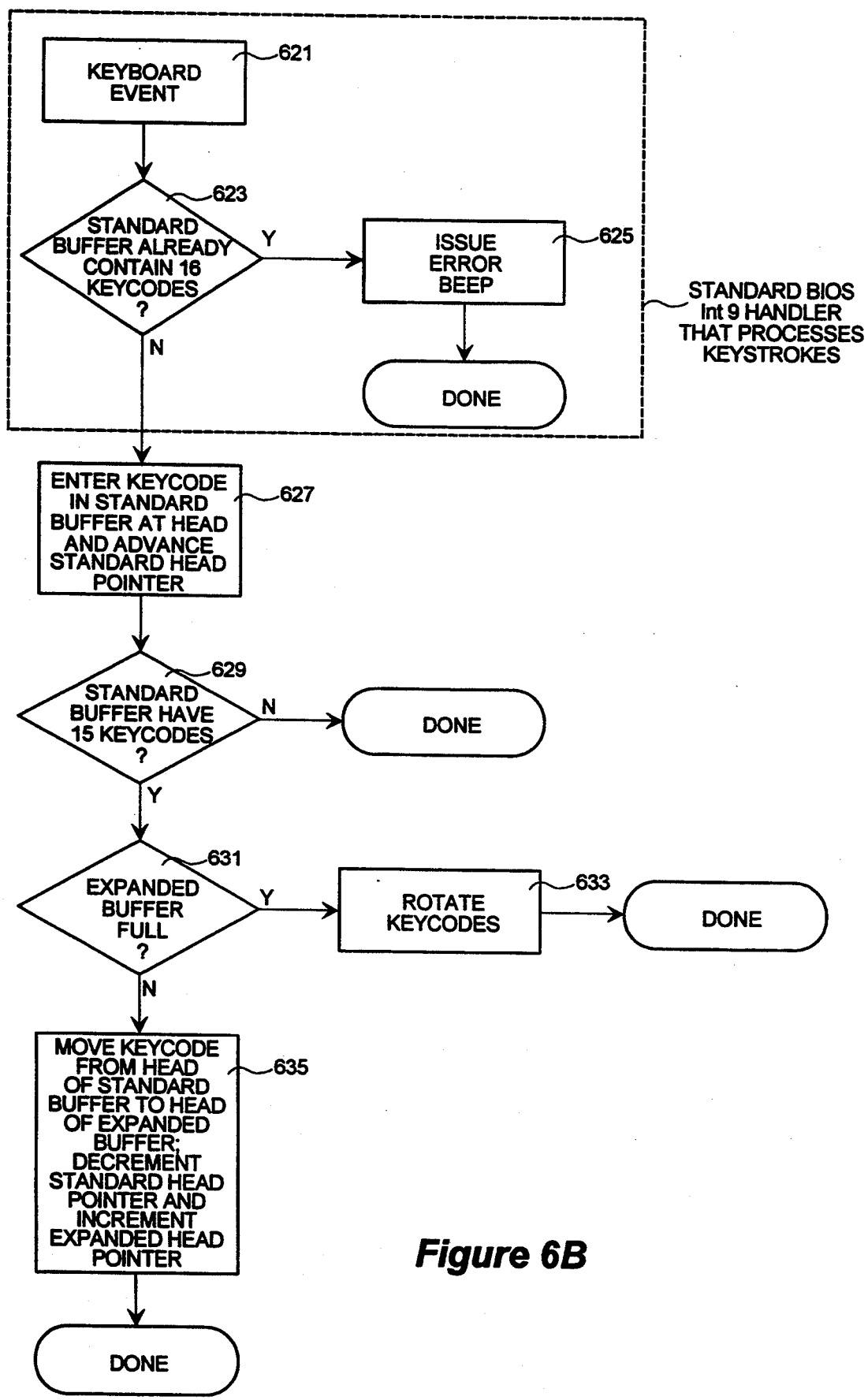
FIG. 6B is a flow diagram of the buffer expanding BIOS extension as it interacts with input from the keyboard.

FIGS. 6A and 6B are flow diagrams illustrating the activities of the buffer expanding BIOS extension for bar code input and keyboard input, respectively. Referring to FIG. 6A, the process starts with step 601 or 603, depending upon the output from the reader services utility program. In step 603, the reader services utility program calls Int 16h to pass a processed ASCII string. Then in step 605, the buffer expanding BIOS extension appends a scan code to each processed ASCII character to produce a keycode, as described above. In step 601, the reader services utility program calls Int 16h to pass a keycode string (ASCII characters plus scan code.

In step 607, the buffer expanding BIOS extension determines whether the last keycode in the input keycode string has been processed. If the last keycode has not been processed, then in step 609 the buffer expanding BIOS extension determines whether the standard buffer 703 is full. Because the standard buffer will hold 16 keycodes, and the last space is reserved, full implies that 15 keycodes have already been placed in the standard buffer. If the standard buffer is not full, then in step 611, the buffer expanding BIOS extension places the keycode at the head of the standard buffer 703 and increments the standard head pointer. Steps 607, 609, and 611 are repeated until the standard buffer is full.

When the standard buffer is full (15 keycodes), in step 613 the buffer expanding BIOS extension determines whether the expanded buffer is full. There is no reserved space in the expanded buffer. If the expanded buffer is not full, then in step 615 the buffer expanding BIOS extension enters the keycode at the head of the expanded buffer and increments the expanded head pointer. Steps 607, 609, 613, and 615 are repeated until the expanded buffer is full. If there are still additional keycodes to process, and both the standard and the expanded buffer are full, then in step 617 the buffer expanding BIOS extension rejects the entire input keycode string. By rejecting the entire string, the label being input will not be fragmented.

FIG. 6B illustrates the activities of the buffer expanding BIOS extension when keyboard input is presented. In step 621, a keyboard event occurs. In step 623, the buffer expanding BIOS extension determines whether the native buffer is already full. Full in this context means containing 16 keycodes. If the standard buffer is already full, then in step 625 an error beep is issued. Steps 621, 623, and 625 comprise the standard BIOS Int 9 handler that processes keystrokes.

If the standard buffer is not already full when a keyboard event occurs, then in step 627 the buffer expanding BIOS extension enters the keycode at the head of the standard buffer and advances the standard head pointer. In step 629, the buffer expanding BIOS extension determines whether the standard buffer is full. (In this context, full means 15 keycodes.) If the standard buffer contains 15 keycodes, then in step 631 the buffer expanding BIOS extension determines whether the expanded buffer is full. If the expanded buffer is full, then in step 633 the buffer expanding BIOS extension rotates keycodes between the standard buffer 703 and the expanded buffer 705 by moving the most recent keycode from the head of the standard buffer to the head of the expanded buffer, and by moving a keycode from the tail of the expanded buffer to the head of the standard buffer. If the expanded buffer is not full, then in step 635 the buffer expanding BIOS extension moves the keycode from the head of the standard buffer to the head of the expanded buffer, decrements the standard head pointer, and increments the expanded head pointer.

To remove keycodes from the standard buffer, a keycode is taken from the tail of the standard buffer and a keycode is rotated from the tail of the expanded buffer to the head of the standard buffer.

The buffer expanding BIOS extension also has the ability to install or remove the expanded buffer. Keycodes that exist in the standard buffer when the expanded buffer is installed should be preserved.

The buffer expanding BIOS extension also has the ability to insert an entire string into the buffer with a single call to the BIOS. Passing strings rather than individual characters eliminates label fragmentation and significantly speeds up the software interface between the reader services utility program and the keyboard stream. As mentioned above, if an entire label will not fit into the expanded buffer, then the entire label is rejected so that the input will not be fragmented.

The intercept is managed in such a way as to allow compatibility with Int 9 intercepts such as that for MS-DOS's International Language support.

Enable/Disable Expanded Keyboard Buffer

```
Inputs
    AH = B4h (function number)
    AL = Command:
        00 - get status only
        01 - enable
        02 - disable
Outputs
    AH = 0 (always)
    AL = Status:
        00 - Command completed.
        01 - Expanded Buffer already installed, or
             already disabled.
        02 - Cannot disable due to expanded buffer NOT
             EMPTY condition (keycodes must be read via Int
             16 h, or the "Flush Expanded Key Buffer" service
             can be called to first empty the buffer)
```

Insert String Into Expanded Keyboard Buffer

```
Inputs
    AH    = B5h (function number)
    AL    = Process-mode number:
        0: ASCII String Format
           (byte-aligned ASCII string; scan code
           lookup is performed by this service
        1: Keycode format
           (word-aligned; 101-keyboard [or arbitrary]
           scancode in MSB, ASCII in LSB);
        2: ASCII Without Lookup
           (byte-aligned ASCII string).
    CX    = Number of characters to push.
    ES:BX = Far pointer to string.
Outputs
    AH    = 0 (always)
    AL    = STATUS:
        0: successful;
        1: keyboard buffer full (string exceeds
           remaining buffer size - rejects entire
           string);
        2: expanded buffer has not been installed;
        3: invalid mode value was passed.
    DX    = remaining capacity:
```

Number of unused keys that remain in the buffer after the passed string has been inserted, or number available prior to the call if the buffer is to full to accommodate the entire string.

Limits and processing Modes. This function will allow a passed string of up to 270 characters (default size) to be inserted into the keypad stream. The caller has two options for encoding a passed string: 1) simple byte aligned ASCII-only, or 2) the entire keycode in which the caller supplies the scan code. The latter option allows the caller to implement a unique character tagging scheme if needed, and allows passing of special keys such as CTL, F1, and ESC.

Flush Expanded Key Buffer

This service allows an application to initialize the expanded buffer from an unknown state. The contents of both the native and the expanded buffers (all pending keycodes) will be "dumped," and the expanded buffer will be ready for new input from the keypad or from string/character insertions. This service will have no effect if the expanded buffer is not enabled (i.e., keys in the native buffer will be preserved).

```
Inputs
    AH = B6h (function number)
Outputs
    AH = 0 (always)
    AL = Status:
        0: Buffer flush completed
        1: Expanded buffer not installed
```

Although the method and system of the present invention have been described in terms of a preferred embodiment, it is not intended that the invention be limited to this embodiment. Modifications within the spirit of the invention will be apparent to those skilled in the art. The scope of the present invention is defined only by the claims that follow.

We claim:

1. A computer system for inputting keycode data and symbol code data into first and second target computer programs operating on the computer system, the computer system having a keyboard input device for inputting the keycode data and a symbol code input device for inputting the symbol code data, the computer system comprising:

a configuration file storing configuration data with which to decode the symbol code data and the keycode data and for receiving and processing reconfiguration requests:

a symbol code device driver for receiving the symbol code data input by the symbol code input device and generating a decoded symbol code data in accordance with the configuration data, the decoded symbol code data comprising data characters and decode information;

a reader services utility program for receiving reconfiguration requests from the target computer programs and for sending the reconfiguration requests to the configuration file, as well as for receiving the decoded symbol code data from the symbol code device driver, interpreting the decode information, and, based upon the interpreted decode information, transforming the data characters into either a data string, or a data string plus reader command information;

a two-way communications channel for sending the reconfiguration requests from the target computer programs to the reader services utility program so as to reconfigure the decoding of the symbol code data in a format requested by the target programs and for sending the decoded symbol code data from the reader services utility program to the target programs; and a buffer for storing the keycode data input by the keycode code input device and the data string generated by the reader services utility program, whereby the first and second target computer programs are able to receive the keycode data and the keycode data string from the buffer.

2. The system of claim 1 further comprising a configuration file, accessible by the reader services utility program and the second target computer program, for providing the configuration data used by the symbol code device driver to generate the decoded symbol code data.

3. The system of claim 2 wherein the symbol code device driver receives the configuration data from the reader services utility program, and the reader services utility program receives the configuration data from the second target computer program.

4. The system of claim 2 wherein the symbol code device driver receives the configuration data from the reader services utility program, and the reader services utility program receives the configuration data from the configuration file.

5. The system of claim 1 wherein the buffer comprises a standard buffer and an expanded buffer for storing a string of character codes having a length of up to 270 character codes.

6. The system of claim 1 wherein the reader command information contains instructions and wherein the keycode data string plus reader command information is received by the second target computer program and the second target computer program processes the keycode data string according to the instructions contained within the reader command information.

7. The computer system of claim 1 wherein the keycode data string generated by the reader services utility program comprises a character code string, the computer system further comprising:
means for receiving the keycode data input by the keyboard input device and storing the keycode data in the buffer;
means for receiving the character code string from the reader services utility program and converting the character code string to an equivalent keycode data string; and
means for storing the keycode data string in the buffer as a contiguous stream of keycode data.

8. A method of inputting a symbol code data into first and second target computer programs operating on a computer system, the computer system having a keyboard input device for inputting keycode data and a symbol code input device for inputting symbol code data, the first target computer program accepting keycode data input by the keyboard input device, but not accepting symbol code data input by the symbol code input device, and the second target computer program accepting symbol code data input by the symbol code input device, the method comprising the steps of:
scanning the symbol code data with the symbol code input device to produce a digital symbol code data;
decoding the digital symbol code data in accordance with a configuration data to produce a decoded symbol code data;
when an indirect access mode is activated,
transforming the decoded symbol code data into a contiguous string of one or more keycodes,
storing, in an uninterrupted process, the contiguous string of one or more keycodes in a keycode buffer so as to ensure data integrity, and
passing the contiguous string of keycodes to the first target computer program; and
when a direct access mode is activated,
transforming the decoded symbol code data into one or more character codes or keycodes plus reader command information, and
passing the one or more character codes or keycodes plus reader command information to the second target computer program.

9. The method of claim 8 wherein the step of passing the contiguous string of keycodes to the first target computer program when the indirect access mode is activated includes passing the contiguous string of keycodes to the second target computer program.

10. The method of claim 8 wherein the steps of transforming the decoded symbol code data include parsing the decoded symbol code data for reader commands, and if the decoded symbol code data contains reader commands, executing the reader commands.

11. The method of claim 8 wherein the step of transforming the decoded symbol code data into one or more keycodes when an indirect access mode is activated includes transforming the decoded symbol code data into one or more character codes and then transforming the one or more character codes into one or more keycodes.

12. A computer system for processing user input comprising:
a keyboard input device for accepting a typewritten data and producing a first keycode;
a symbol code input device for accepting a symbol code data and producing a digital symbol code data;
a symbol code device driver for receiving the digital symbol code data from the symbol code input device and generating a decoded symbol code data in accordance with a configuration data;
a reader services utility program for receiving the decoded symbol code data from the symbol code device driver and generating a second keycode or a processed symbol code data plus reader command information, the reader services utility program providing the configuration data to the symbol code device driver;
a keycode buffer for storing the first and second keycodes;
a basic input/output system for receiving the first keycode from the keyboard input device and the second keycode from the reader services utility program and storing the first and second keycodes in the keycode buffer;
a non-symbol code reading program for accepting and processing the first and second keycodes from the keycode buffer;
a symbol code reading program for accepting and processing the processed symbol code data plus reader command information from the reader services utility program;
a data-type determiner for distinguishing between the processed symbol code data plus reader command information, and the first and second keycodes: and
an arbitrator, responsive to the data-type determiner, for only transferring the processed symbol code data plus reader command information to the symbol code reading program and for only transferring the first and second keycodes to the non-symbol code reading program.

13. The computer system of claim 12 wherein the basic input/output system further comprises a buffer expanding basic input/output extension for receiving a plurality of second keycodes from the reader services utility program and storing the plurality of second keycodes in the keycode buffer as a contiguous string of keycodes.

14. The computer system of claim 12 additionally comprising a configuration file for storing the configuration data, the configuration file accessible by the reader services utility program.

15. The computer system of claim 12 wherein the keycode buffer comprises a standard buffer and an expanded buffer for storing more keycodes than the standard buffer, and the buffer expanding basic input/output extension coordinating rotation of keycodes between the standard buffer and the expanded buffer.

16. A method in a computer system of inputting a contiguous string of data characters into a computer program operating on the computer system, the computer system having a keyboard input device, and the computer program accepting data characters from the keyboard input device, the method comprising the steps of:

receiving the contiguous string of data characters in response to user input;

transforming the contiguous string of data characters to a contiguous string of equivalent keyboard data; and storing, in an uninterrupted process, the contiguous string of equivalent keyboard data in a buffer on the computer system so as to ensure data integrity, the buffer being accessible to the computer program.

* * * * *